(12) United States Patent
Leque

(10) Patent No.: US 11,918,934 B2
(45) Date of Patent: Mar. 5, 2024

(54) OIL FILTRATION SYSTEM

(71) Applicant: RTX Corporation, Farmington, CT (US)

(72) Inventor: Nicholas D. Leque, Vernon, CT (US)

(73) Assignee: RTX CORPORATION, Farmington, CT (US)

(*) Notice: Subject to any disclaimer, the term of this patent is extended or adjusted under 35 U.S.C. 154(b) by 535 days.

(21) Appl. No.: 15/613,865

(22) Filed: Jun. 5, 2017

(65) Prior Publication Data
US 2018/0345172 A1    Dec. 6, 2018

(51) Int. Cl.
| | | |
|---|---|---|
| B01D 11/02 | (2006.01) |
| F01D 25/18 | (2006.01) |
| F01M 1/10 | (2006.01) |
| F01M 11/03 | (2006.01) |

(52) U.S. Cl.
CPC .......... *B01D 11/0284* (2013.01); *F01D 25/18* (2013.01); *F01M 2001/1057* (2013.01); *F01M 2001/1092* (2013.01); *F01M 11/03* (2013.01); *F05D 2260/606* (2013.01); *F05D 2260/607* (2013.01); *F16N 2210/02* (2013.01)

(58) Field of Classification Search
None
See application file for complete search history.

(56) References Cited

U.S. PATENT DOCUMENTS

| | | | | |
|---|---|---|---|---|
| 3,270,884 A | * | 9/1966 | Bremer | B01D 29/21 |
| | | | | 116/DIG. 42 |
| 4,038,189 A | | 7/1977 | Dison et al. | |
| 4,783,271 A | * | 11/1988 | Silverwater | B01D 29/15 |
| | | | | 210/149 |
| 5,811,002 A | * | 9/1998 | Felber | B01D 29/232 |
| | | | | 210/315 |
| 6,488,848 B1 | | 12/2002 | Smith | |

(Continued)

FOREIGN PATENT DOCUMENTS

| | | |
|---|---|---|
| DE | 102007062098 A1 | 6/2009 |
| WO | 9745627 A1 | 12/1997 |

OTHER PUBLICATIONS

Search Report regarding related EP App. No. 18176150.3; dated Oct. 9, 2018; 8 pgs.

(Continued)

*Primary Examiner* — Benjamin M Kurtz
(74) *Attorney, Agent, or Firm* — CANTOR COLBURN LLP

(57) ABSTRACT

An oil filtration system includes an oil chamber inlet. Also included is a first screen defining a first chamber volume that receives an oil flow from the oil chamber inlet, the first screen having a first mesh coarseness. Further included is a second screen surrounding the first screen to define a second chamber volume surrounding the first chamber volume, the second screen having a second mesh coarseness that is greater than the first mesh coarseness. Yet further included is at least one exit nozzle having an exit cross-sectional area that is greater than or equal to a cross-sectional area of apertures of the second screen. Also included is a bypass valve disposed in a first position during a first pressure condition within the first chamber volume and in a second position during a second pressure condition within the first chamber volume.

8 Claims, 3 Drawing Sheets

(56) References Cited

U.S. PATENT DOCUMENTS

| | | | |
|---|---|---|---|
| 6,540,914 B1 | 4/2003 | Smith | |
| 7,883,621 B2 | 2/2011 | Bontaz et al. | |
| 9,339,746 B2 | 5/2016 | Hubbard | |
| 2002/0170852 A1* | 11/2002 | Reinhardt | B01D 29/23 210/132 |
| 2004/0074827 A1* | 4/2004 | Sann | B01D 35/147 210/132 |
| 2006/0027510 A1 | 2/2006 | Rassinger | |
| 2012/0006731 A1* | 1/2012 | Swift, Jr. | B01D 29/58 210/133 |
| 2014/0150439 A1* | 6/2014 | Parnin | F01D 25/20 60/772 |
| 2016/0032770 A1* | 2/2016 | Sheridan | B01D 19/0068 60/39.08 |

OTHER PUBLICATIONS

EP Office Action for Application No. 18 176 150.3; dated Jan. 25, 2021.

* cited by examiner

OIL FILTRATION SYSTEM

BACKGROUND

Exemplary embodiments pertain to the art of gas turbine engines and, more particularly, to an oil filtration system that may be used in conjunction with a gas turbine engine.

Gas turbine engines include several components that rely on functioning bearing operation. In plain bearing operation, it is imperative that clean (e.g., debris-free) oil is delivered to the working surfaces due to the small clearances required. As such, oil filtration is typically incorporated into the lubrication scheme of the machine system. Furthermore, in order to safeguard against system generated debris failure of the bearing, such systems may also make use of a last chance screen that has courser filtration than a main system filter, yet fine enough to ensure continued bearing operation. However, if the upstream failure is severe enough, the last chance screen may clog, limiting or cutting off flow to the bearing. Therefore, there is a need for a last chance screen assembly that ensures continued oil supply to the bearing, even in the event of a clog.

BRIEF DESCRIPTION

Disclosed is an oil filtration system that includes an oil chamber inlet. Also included is a first screen defining a first chamber volume that receives an oil flow from the oil chamber inlet, the first screen having a first mesh coarseness. Further included is a second screen surrounding the first screen to define a second chamber volume surrounding the first chamber volume, the second screen having a second mesh coarseness that is greater than the first mesh coarseness. Yet further included is at least one exit nozzle having an exit cross-sectional area that is greater than or equal to a cross-sectional area of apertures of the second screen. Also included is a bypass valve disposed in a first position during a first pressure condition within the first chamber volume, the first position closing a bypass opening fluidly coupling the first chamber volume and the second chamber volume, the bypass valve disposed in a second position during a second pressure condition within the first chamber volume, the second position opening the bypass opening.

Also disclosed is a gas turbine engine that includes a fan section, a compressor section, a turbine section, and an oil filtration for supplying a filtered oil flow to one or more bearings in a gearbox through an oil supply line. The oil filtration system includes an oil chamber inlet. The oil filtration system also includes a first screen defining a first chamber volume that receives an oil flow from the oil chamber inlet. The oil filtration system further includes a second screen surrounding the first screen to define a second chamber volume surrounding the first chamber volume. The oil filtration system yet further includes a bypass valve moveable between a closed position and an open position, the bypass valve disposed in the closed position up to a threshold pressure of the first chamber volume, the bypass valve disposed in the open position when first chamber volume has a pressure above the threshold pressure to route the oil flow through a bypass opening fluidly coupling the first chamber volume and the second chamber volume.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
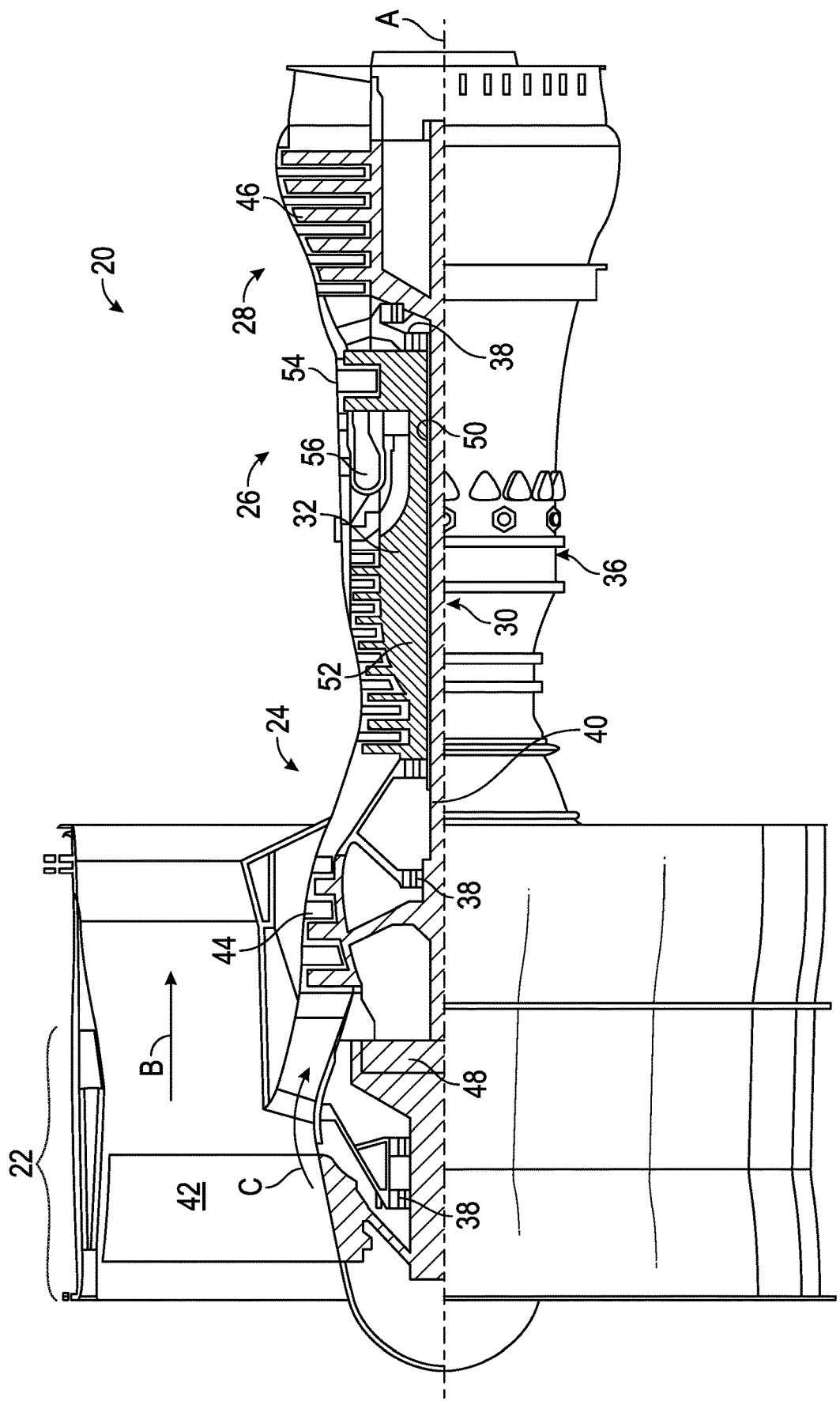
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture or fan drive gear system 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
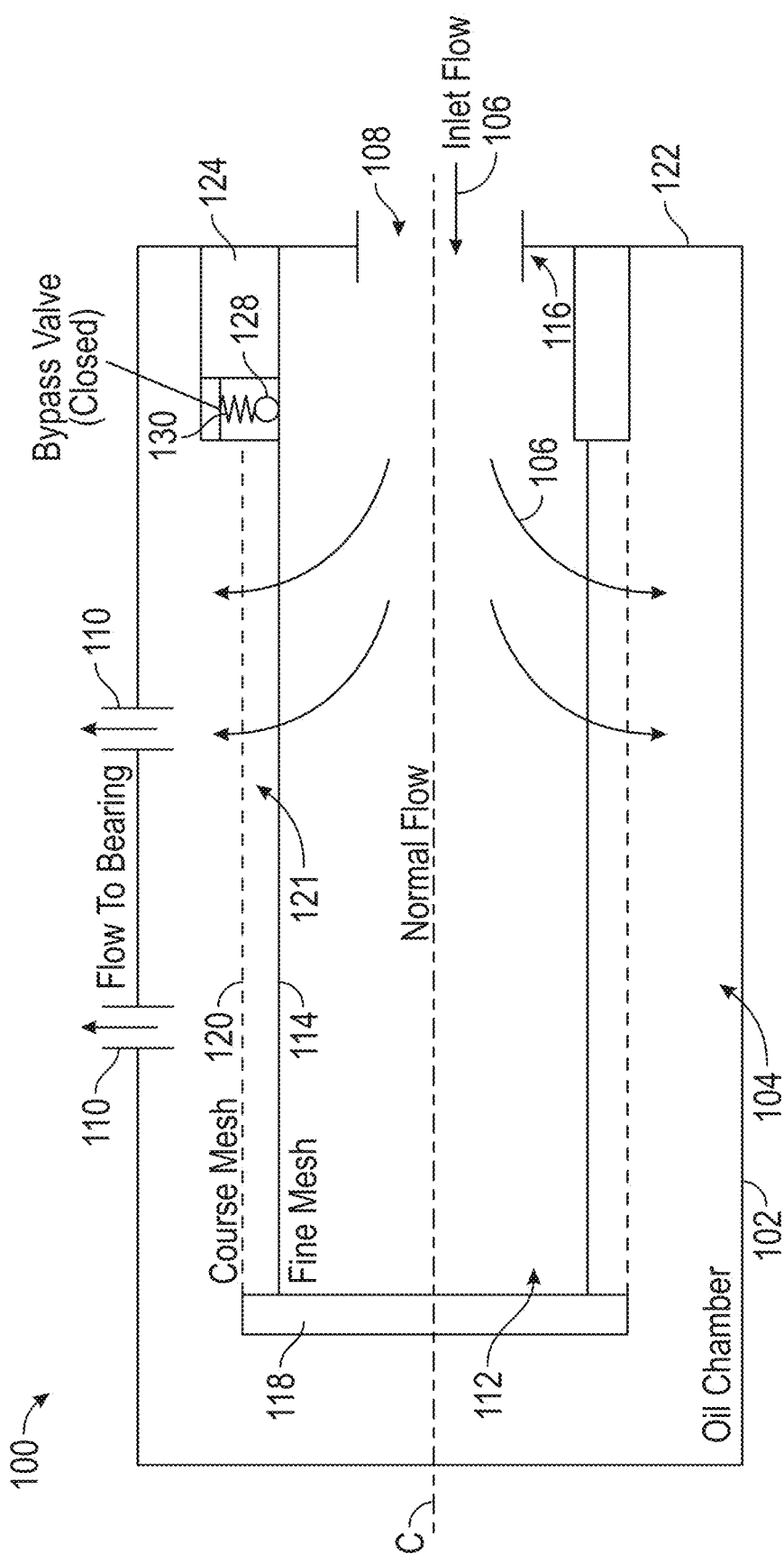
FIG. 2 is an elevational view of an oil filtration system in a first operating condition.

Referring now to FIG. 2, an oil filtration system is illustrated and referenced generally with numeral 100. The oil filtration system 100 is part of an oil supply system that routes oil from an oil source to one or more bearings used within the gas turbine engine 20. It is to be understood that the oil filtration system 100 may be used to filter an oil flow that is routed to bearings located in numerous places of the engine 20. For example, in some embodiments the bearings are journal bearings disposed within a gearbox, such as gear architecture 48 (FIG. 1). In some embodiments, the bearings are part of bearing systems 38 (FIG. 1). These are merely exemplary locations for the bearings and it is contemplated that any bearings may receive filtered oil from the oil filtration system 100.

As shown, the oil filtration system 100 includes an oil chamber 102 that defines an interior region 104. The interior region 104 is configured to contain oil that is to be supplied to the bearing(s) discussed above. In particular, an oil flow 106 is provided to the interior region 104 via an oil chamber inlet 108. As described herein, the oil flow 106 supplied to the oil chamber 102 is filtered therein and subsequently expelled from the oil chamber 102 via one or more exit nozzles 110. The exit nozzle(s) 110 directs the oil flow 106 to an oil supply line that routes the filtered oil to the bearing(s).

Filtration of the oil flow 106 is achieved by a dual screen arrangement that ensures continued oil supply to the bearing(s), as described herein. As described above, the oil flow 106 is provided to the oil chamber 102. More specifically, a first chamber volume 112 that is a sub-volume of the interior region 104 receives the oil flow 106 from the oil chamber inlet 108. The first chamber volume 112 is at least partially defined by a first screen 114. In some embodiments, the first screen 114 is substantially cylindrical, but other shapes may be suitable. The first chamber volume 112 extends from a first end 116 to a second end 118, with the oil chamber inlet 108 being located proximate the first end 116 of the first chamber volume 112. The second end 118 is a solid structure. The first screen 114 has a fine mesh that is referred to herein as a first mesh. The fine mesh filters the oil flow 106 by removing particulate matter (e.g., debris) from the oil flow 106 as the oil flow passes radially outwardly through the first screen 114.

A second screen 120 is positioned outwardly of the first screen 114. In other words, if the oil chamber 102, and thereof the first chamber volume 112, extends along a centerline C in an axial direction, the second screen 120 is positioned radially outward of the first screen 114 in a surrounding orientation. The first and second screen 114, 120 define a second chamber volume 121 that is an annular volume in cylindrical embodiments of the screens 114, 120. The second screen 120 is formed of a coarse mesh (also referred to herein as a second mesh), relative to the fine mesh of the first screen 114. In particular, the coarseness of the second screen 120 is greater than that of the first screen 114. The coarseness (or fineness) of the screen meshes described herein may be calculated in any acceptable manner suitable in the industry. For example, a mesh count or mesh diameter may be employed. The precise range of mesh coarseness of the first and second screens 114, 120 will depend upon the particular application, but the relative coarseness is of interest herein. Specifically, the second screen 120 must have a mesh that is coarser than that of the first screen 114. This ensures that debris that is small enough to fit through the openings of the fine mesh of the first screen 114 will also pass through the openings of the mesh of the second screen 120.

A first operating condition of the oil chamber 102 is shown in FIG. 2, as the oil flow 106 passes radially through the first screen 114 and subsequently the second screen 120. The oil flow 106 then continues to pass through the exit nozzle(s).

Figure 3:
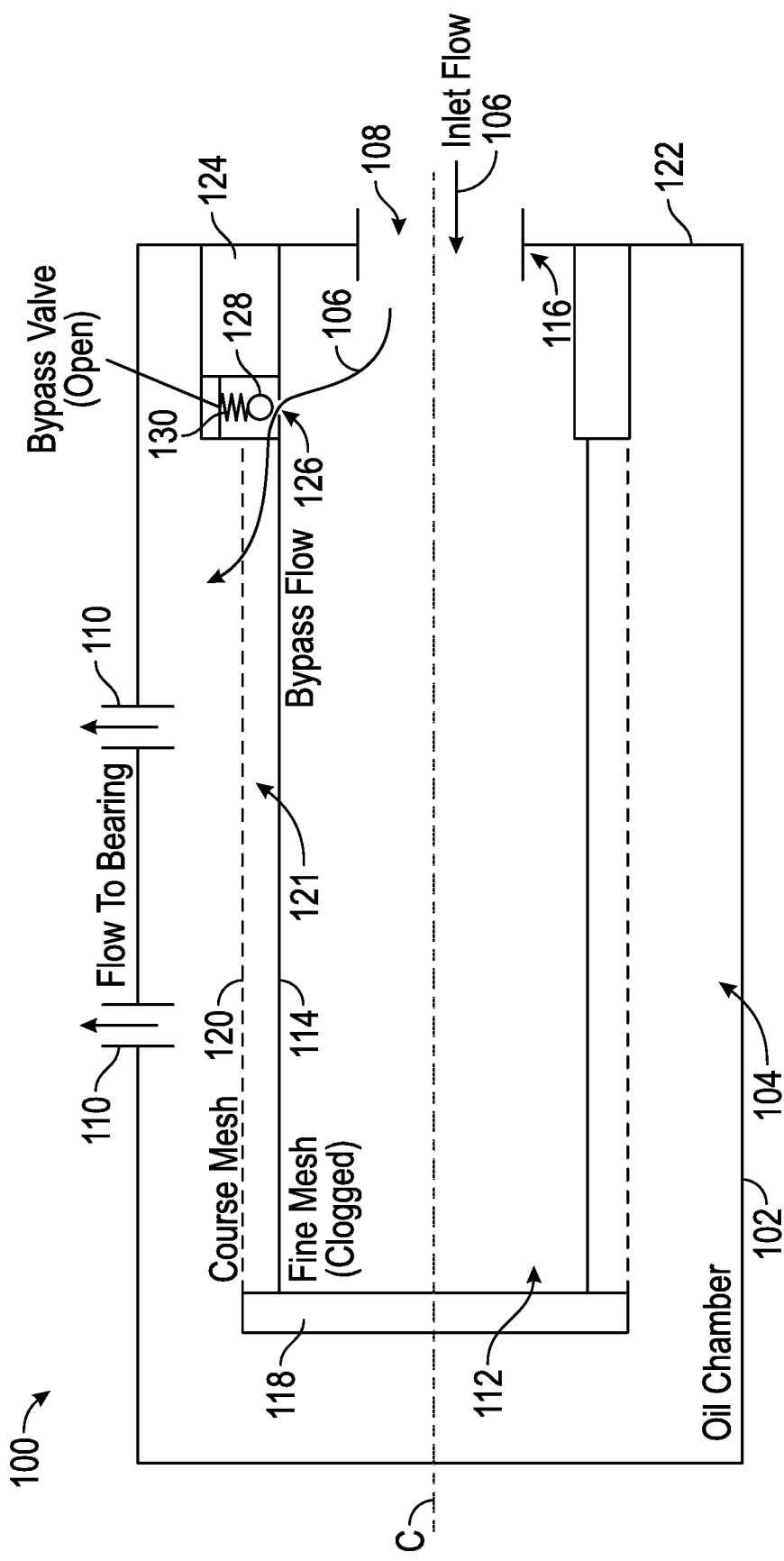
FIG. 3 is an elevational view of the oil filtration system in a second operating condition.

In the illustrated embodiment, the first screen 114 does not extend completely to an end 122 of the oil chamber 102. Rather, the first screen 114 extends to a wall 124 that extends from the end 122 of the oil chamber 102. The wall 124 has a geometry that substantially corresponds to the geometry of the first screen 114, such as cylindrical in some embodiments. The wall 124 defines a bypass opening 126 (FIG. 3) that is maintained in a blocked condition during a first pressure condition of the first chamber volume 112. The blocked condition is achieved with a bypass valve 128 that is coupled to the wall 124 or another suitable structure within the oil chamber 102. The bypass valve 128 is moveable between a first position (FIG. 2) and a second position (FIG. 3) in various contemplated manners. For example, a spring 130 that biases the bypass valve 128 toward the first position may be employed, as illustrated. The first position of the bypass valve 128 corresponds to the blocked, or closed condition of the bypass opening 126. It is contemplated that a solenoid or an alternative valve control mechanism may be employed.

As discussed above, the first screen 114 filters debris from the oil flow 106 as it passes therethrough. Over time, the first screen 114 will begin to clog. This occurs gradually from the second end 118 to the first end 116. In other words, the first screen 114 initially builds up debris proximate the second end 118 and the clogging progresses toward the first end 116. As the clogging progresses, the pressure within the first chamber volume 112 increases. At a threshold pressure, the pressure overcomes the force applied by the spring 130 that biases the bypass valve 128 to the first, closed position. As this occurs, the pressure in the first chamber volume 112 biases the bypass valve 128 to the second, open position (FIG. 3) to fluidly couple the first chamber volume 112 to the second chamber volume 121. Therefore, the bypass valve 128 is closed when the first chamber volume 112 is in a first pressure condition defined by a pressure range that is below the threshold pressure and the bypass valve 128 is open when the first chamber volume 112 is in a second pressure condition defined by a pressure range that is above the threshold pressure.

The first screen 114 is configured with a mesh size that is directed at capturing debris that would have general, long term wear effects on the bearing(s) that the oil is routed to. However, it is not desirable to completely discontinue oil flow to the bearing(s). Therefore, the second screen 120 is provided with a coarser mesh to continue to allow oil to be provided to the bearing(s), while still filtering the oil for particulate matter that is too large for routing to the bearing(s) through the exit nozzle(s) 110. To ensure that the appropriate debris is filtered by the second screen 120, the mesh of the second screen is finer than the cross-sectional area of the exit nozzle(s) 110 (i.e., second screen openings are smaller than or equal to the exit nozzle opening).

The embodiments disclosed herein provide an additional safeguard to the oil filtration process. Without a bypass, clogging of the "last chance" screen would result in bearing starvation and imminent failure. The embodiments described facilitate continued system operation because the foil flow is diverted around the clogged screen (i.e., first screen 114) and through the second screen 120. Therefore, overall system reliability and safety is increased.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
a fan section;
a compressor section;
a turbine section;
an oil source;
one or more bearings;
an oil filtration system that filters oil from the oil source prior to it being supplied to the one or more bearings, the oil filtration system including:
an oil chamber inlet defined on a first face of a housing;
a first screen disposed within the housing and defining a first chamber volume that receives an oil flow from the oil chamber inlet in a first axial direction;
a second screen disposed within the housing and surrounding the first screen to define a second chamber volume surrounding the first chamber volume; and
a bypass valve disposed within the housing and moveable between a closed position and an open position, the bypass valve disposed in the closed position up to a first threshold pressure of the first chamber volume, the bypass valve disposed in the open position when the first chamber volume has a pressure above the first threshold pressure to route the oil flow through a bypass opening fluidly coupling the first chamber volume and the second chamber volume and to route the oil flow through at least one exit nozzle located on a second face of the housing, the second face being angularly oriented with respect to the first face such that the at least one exit nozzle is aligned with a filtered oil flow that flows radially from the first axial direction through the first screen and the second screen, wherein the oil flow must pass through the second screen prior to it flowing to the at least one exit nozzle such that there is no bypass path around the second screen.

2. The gas turbine engine of claim 1, the first screen having a first mesh coarseness, the second screen having a second mesh coarseness that is greater than the first mesh coarseness, and the at least one exit nozzle having an exit cross-sectional area that is greater than or equal to a cross-sectional area of apertures of the second screen.

3. The gas turbine engine of claim 1, wherein the first screen is cylindrical.

4. The gas turbine engine of claim 3, wherein the second screen is cylindrical, the second chamber volume being an annular volume defined by the first and second screens.

5. The gas turbine engine of claim 1, further comprising a spring biasing the bypass valve to maintain the bypass valve in the closed position during a first pressure condition, which is less than the first threshold pressure.

6. The gas turbine engine of claim 1, wherein the first chamber volume extends in an axial direction from a first end to a second end, the oil chamber inlet located proximate the first end.

7. The gas turbine engine of claim 6, wherein debris filtered from the oil flow initially builds up within the first screen proximate the second end and progresses toward the first end.

8. The gas turbine engine as in claim 1, wherein the second face is perpendicularly arranged with respect to the first face.

\* \* \* \* \*